(12) United States Patent
Akchurin et al.

(10) Patent No.: US 10,228,977 B2
(45) Date of Patent: Mar. 12, 2019

(54) MANAGING DISTRIBUTED ANALYTICS ON DEVICE GROUPS

(71) Applicant: Microsoft Technology Licensing, LLC, Redmond, WA (US)

(72) Inventors: Eldar Akchurin, Aachen (DE); Olivier Nano, Aachen (DE); Panos Periorellis, Aachen (DE); Ivo José Garcia dos Santos, Aachen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/865,251

(22) Filed: Jan. 8, 2018

(65) Prior Publication Data

US 2018/0225152 A1   Aug. 9, 2018

Related U.S. Application Data

(63) Continuation of application No. 13/438,836, filed on Apr. 3, 2012, now Pat. No. 9,886,321.

(51) Int. Cl.
*G06F 15/173*   (2006.01)
*G06F 9/50*   (2006.01)

(52) U.S. Cl.
CPC .................... *G06F 9/5061* (2013.01)

(58) Field of Classification Search
CPC ..................................... G06F 9/5061

USPC ......................................................... 709/223
See application file for complete search history.

(56) References Cited

U.S. PATENT DOCUMENTS

| 8,296,434 | B1 * | 10/2012 | Miller | ................ | H04L 67/1029 |
| | | | | | 709/226 |
| 2009/0037534 | A1 * | 2/2009 | Castro | .................... | G06Q 10/10 |
| | | | | | 709/205 |
| 2012/0331090 | A1 * | 12/2012 | Kimchi | ............... | H04L 67/1046 |
| | | | | | 709/217 |

* cited by examiner

*Primary Examiner* — Sm A Rahman

(57) ABSTRACT

Methods of managing distributed analytics on device groups are described. In an embodiment, a management service within a distributed analytics system provides an interface to allow a user to define a group of devices based on a property of the devices. When the property of a device in the system satisfies the criterion specified by the user, the device is added to the group and the device may subsequently be removed from the group if the device no longer satisfies the criterion. Once a group has been defined, the management service enables users to specify management operations, such as creating, starting, stopping or deleting queries or management operations relating to other entities of end devices, which are to be implemented on all the devices in the group and the management service propagates the operation to all devices in the group, irrespective of their current connectivity status.

20 Claims, 8 Drawing Sheets

MANAGING DISTRIBUTED ANALYTICS ON DEVICE GROUPS

CROSS-REFERENCE TO RELATED APPLICATIONS

This application is a continuation of U.S. Non-Provisional application Ser. No. 13/438,836, filed Apr. 3, 2012, the entirety of which is hereby incorporated by reference herein.

BACKGROUND

There are many industries and applications where it is useful to gather data generated by multiple sources and process and correlate that data in real-time. Examples include manufacturing process monitoring and control, web analytics (e.g. clickstream analysis), financial services, power utilities, healthcare and IT monitoring. The analysis of the data which is generated by multiple sources may be performed by a complex event processing (CEP) server which receives streams of data from the various sources and implements standing queries on the data received. The CEP server may then output data to event monitoring devices (e.g. to alert someone of an error or fault situation), data stores or to devices running applications which display results of the real-time analysis (e.g. key performance indicator dashboards or trading stations).

The embodiments described below are not limited to implementations which solve any or all of the disadvantages of known distributed analytics systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods of managing distributed analytics on device groups are described. In an embodiment, a management service within a distributed analytics system provides an interface to allow a user to define a group of devices based on a property of the devices. When the property of a device in the system satisfies the criterion specified by the user, the device is added to the group and the device may subsequently be removed from the group if the device no longer satisfies the criterion. Once a group has been defined, the management service enables users to specify management operations, such as creating, starting, stopping or deleting queries or management operations relating to other entities of end devices, which are to be implemented on all the devices in the group and the management service propagates the operation to all devices in the group, irrespective of their current connectivity status.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
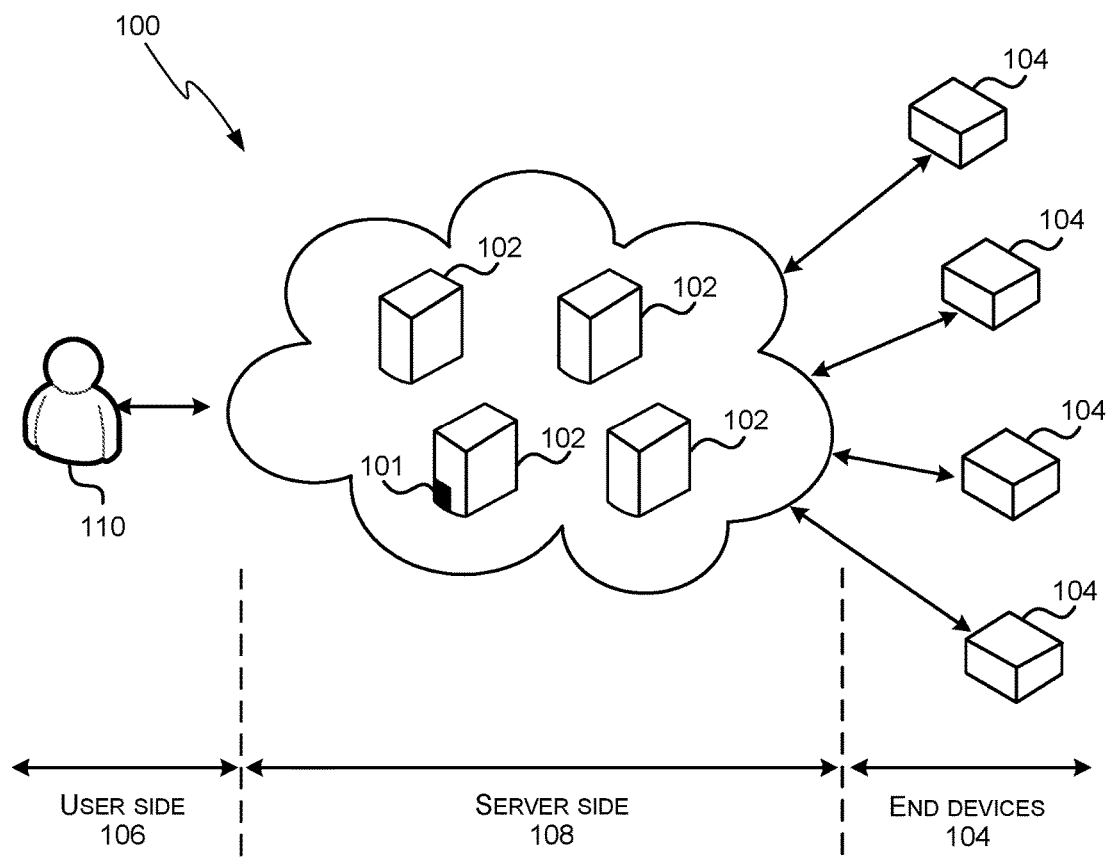
FIG. 1 is a schematic diagram of an example distributed analytics system which comprises a management service.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In an example complex event processing (CEP) architecture, a standalone CEP server receives streams of data (which may also be referred to as 'event streams') pushed by multiple sources of data and then implements standing queries on those data streams. To scale this up to handle larger quantities of data (e.g. with data from many more sources), the standalone CEP server may be replaced by a distributed system of analytics engines running on a plurality of servers and there may be large numbers (e.g. hundreds, thousands or millions) of end devices. These end devices are sources of data and may also perform some initial analysis and/or aggregation of the local data. Such a system may be referred to as an 'Edge to Cloud' (E2C) system, although the methods described below can be implemented in both cloud-based systems and non-cloud-based systems and any reference to operations in the cloud in the description below is by way of example only.

In order to perform an analytics management operation on a particular device (e.g. a particular end device), such as creating, starting, stopping or deleting a query, in such a distributed analytics system, a user has to establish a direct connection with the device (and in particular with the device's management service) and although this works for systems with small numbers of devices, it does not scale well. Managing very large numbers of devices on an individual basis is not possible in reality. Management of the system is further complicated by a user's lack of control over the connectivity of particular end devices to the system, especially where end devices have intermittent or unreliable connections.

The term 'Edge to cloud' (E2C) is used herein to describe a distributed system comprising analytics engines (such as Microsoft® StreamInsight™) running in the cloud and on large numbers (e.g. thousands) of embedded devices. The term 'Edge to cloud service' is used herein to refer to the service located within the cloud, and exposed via an E2C server, which performs both global analytics and management.

The term 'management service' is used herein to describe a service which provides methods to manage entities within a distributed analytics system agnostic of the device connectivity state. Examples of such entities include Microsoft® StreamInsight™ entities including applications, event types, input/output adapters, query templates and queries. Where the distributed analytics system is an E2C system, the management service may be part of the E2C service.

The term 'management operation' is used herein to describe an operation which manages an entity in the distributed analytics system (such as applications, event types, input/output adapters, query templates and queries) and such operations include, but are not limited to, creating, starting, stopping and deleting an entity. In the following description any reference to a management operation which creates, starts, stops or deletes a query is by way of example only and the management operation may instead relate to another type of entity.

The term 'named stream' is used herein to describe a named stream of events. A named stream is a temporal stream to which queries can bind to produce or consume events. A named stream can have different number of consumers and producers which are composed dynamically. Consumers and producers of a named stream can be located on different physical machines, making named streams a very convenient abstraction for data propagation.

The term 'end device' is used herein to describe a source of data and may, for example, be an embedded device.

The term 'scope' is used herein to describe a logical boundary that encapsulates both server side (e.g. cloud) and end device elements within a system and contains a set of entities.

FIG. 1 is a schematic diagram of an example distributed analytics system 100 which comprises a management service 101 running on a server 102 and this management service enables users to define groups of end devices 104 and then manage entire groups of end devices in a single operation. Where the group is defined to comprise all the end devices within the system, the management service enables users to manage the whole system as a single entity (rather than as a collection of standalone end devices). Methods of managing temporarily disconnected devices within a group are also described below and these methods provide an optional enhancement to the management service shown in FIG. 1.

As shown in FIG. 1, the example distributed analytics system 100 may be conceptually divided into three parts: user side 106, server side 108 and end devices 104. The server side 108 comprises a plurality of servers 102 and the management service 101 runs on one or more of these servers 102. The main role of these servers (alongside the provision of the management service 101) is to analyze the data coming from the end devices 104 and this analysis which is performed by the server side may be referred to as the global analytics (to differentiate it from the local analytics which may be performed on the end devices themselves). The servers 102 may, for example, be part of a cloud-based system or they may be on-premises servers. The end devices 104 are sources of data (i.e. sources of streams) and may also perform some local/preliminary analysis and/or aggregation of local data before providing data to the server side 108. The user side 106 of the system provides an interface (e.g. an API) to a user 110 and by programming against this interface, the user can define groups of end devices, deploy queries on different groups of end devices and analyze their output on servers 102 in the server side 108.

The operation of the management service (which runs on a server 102) can be described with reference to the example flow diagram in FIG. 2. The management service provides an interface for a user to define groups of devices within the system (block 202). These groups are defined based on one or more properties of a device, where a property may be a static property or a dynamic property (i.e. a property which changes, or may change, over time). Examples of static properties include, but are not limited to, hardware properties (e.g. the particular processor within a device). Examples of dynamic properties include, but are not limited to, CPU usage (which may also be referred to as CPU load), speed, memory consumption, existence of warning/alert on a device, misbehavior and GPS in a predefined area. The properties which may be used may dependent on the type of end devices. For example, if the end devices are cars, the dynamic properties may comprise one or more of: speed, coordinate and average mileage. If, however, the end devices are robots on a factory floor, the dynamic properties may comprise one or more of: temperature, number of rotations per minute and vibrations. In some examples, only static or dynamic properties may be used in the definition of groups and in other examples a combination of one or more static properties and one or more dynamic properties may be used. The interface which is provided by the management service to enable definition of a group of devices also enables a user to manage queries running on end devices and servers.

In response to receiving data from a user defining a group (in block 204) where, as described above, a group is defined as a temporal query on one or more properties (static and/or dynamic) of a device (e.g. CPU load>50%), the management service controls which end devices within the system 100 belong to the group (block 206) i.e. the management service controls group membership. In an example, the management service may store information on the static properties of devices and therefore use this stored information to determine whether a device belongs to the newly specified group or not. In another example, a query may be pushed to each device which may locally determine whether it meets the specified criteria in relation to the specified one or more properties and then indicate to the management service whether the device belongs to the group or not. This second method reduces the bandwidth used and may be particularly suitable where dynamic properties are used as the values of the properties may be constantly changing on end devices. In some examples, the group membership may be context dependent (e.g. the group may have a maximum size, X, such that only the first X end devices which satisfy the group criteria join the group) and an example query would be "Group the top 10 devices in terms of CPU usage". In such situations, the group query needs to run centrally (on a server) rather than locally on end devices.

Subsequently, when the management service receives details of a management operation from the user along with details of group to which the management operation is to be associated (in block 208), the management service executes that management operation on each end device within the group (block 210).

The data which is received from a user defining a group (in block 210) may be in the form of a streaming query, which may be referred to as a 'criteria query' or 'grouping query', which runs continuously in a server so that it can identify as soon as a device satisfies the group criteria and add that device to the group. Alternatively, as described above, this grouping query (or a related query) may be pushed to the devices and run continuously on those devices so that they notify the management service when they meet the group criteria.

In examples where a group is defined based on a dynamic property of a device, the nature of the group is dynamic (even where a static property is also used to define the group) and devices may leave and join the group at any time.

In various examples, the grouping query (i.e. the query which defines the group) may be a temporal streaming query, i.e. the query may include some temporal aspect, such as a time period for which the query is valid (e.g. the query is only valid for one hour, after which time additional devices who satisfy the criteria will not be added to the group) and/or a time period in relation to the dynamic property (e.g. CPU load >50% for >1 hour).

In various examples, the management service may feed a named stream of events, where each event represents a device in the group (e.g. using a device identifier). When a device joins the group, an event representing the device is added to the named stream and if the device subsequently leaves the group, the corresponding event is deleted (i.e. ended). This named stream may then be used in the group operations (in block 210) as shown in the following pseudo code example of a call to deploy a query (queryA) on the set of devices specified as a named stream (namedStreamDefiningGroup):

createQueryOnDevice (queryA, namedStreamDefiningGroup)

Other types of group operations, such as start/stop/delete query may be based on the same principle and the management operations may relate to other entities of end devices (i.e. the methods described herein are not limited to management operations relating to queries).

As described above, as soon as a device satisfies the group criteria (or group criterion), it is added to the group. If the group criteria does not hold any more (e.g. CPU load falls below 50%, where the group criterion is CPU load>50%), the device may leave the group immediately (and automatically). In an example, where a user deploys queryA on all cars that exceed the speed limit of 80 miles per hour (mph), as soon as the car's speed goes over 80 mph, the car is added to the group and queryA is deployed. If the speed goes below 80 mph in the next moment, the car will leave the group, but the query will still be running on it. In this scenario, if the user wants to delete the query, they will need to do this explicitly on the particular car using the corresponding API. In other implementations, however, the device may remain in the group for a period of time (e.g. until a management operation has been completed or until a user manually removes the device from the group) or the user may specify what happens when a device no longer meets the group criteria (e.g. referring back to the previous example, the queryA on the car with the speed that has fallen below 80 mph will be deleted if the user specified a delete operation for devices leaving the group). In an example of manual removal of an end device from a group, if a fire alarm rings for 10 minutes and then stops, that alarm stays raised (i.e. the alarm remains in the group) for further monitoring until a user can check that there is no fire and that everything is safe. At this point, the user can manually remove the alarm from the group.

In situations where a dynamic parameter used in defining the group changes very rapidly, a time period may be specified (e.g. 30 minutes) such that a device does not leave the group until the group criteria have not been satisfied for this continuous period of time (e.g. speed <80 mph for a continuous period of 30 minutes). This reduces the churn in membership of a group, for example, it would stop a device repeatedly joining and leaving a group where the device's dynamic parameter varied around the value specified in the group criterion, for example where the car in the earlier example had a speed that varied between 75 and 85 mph.

Figure 2:
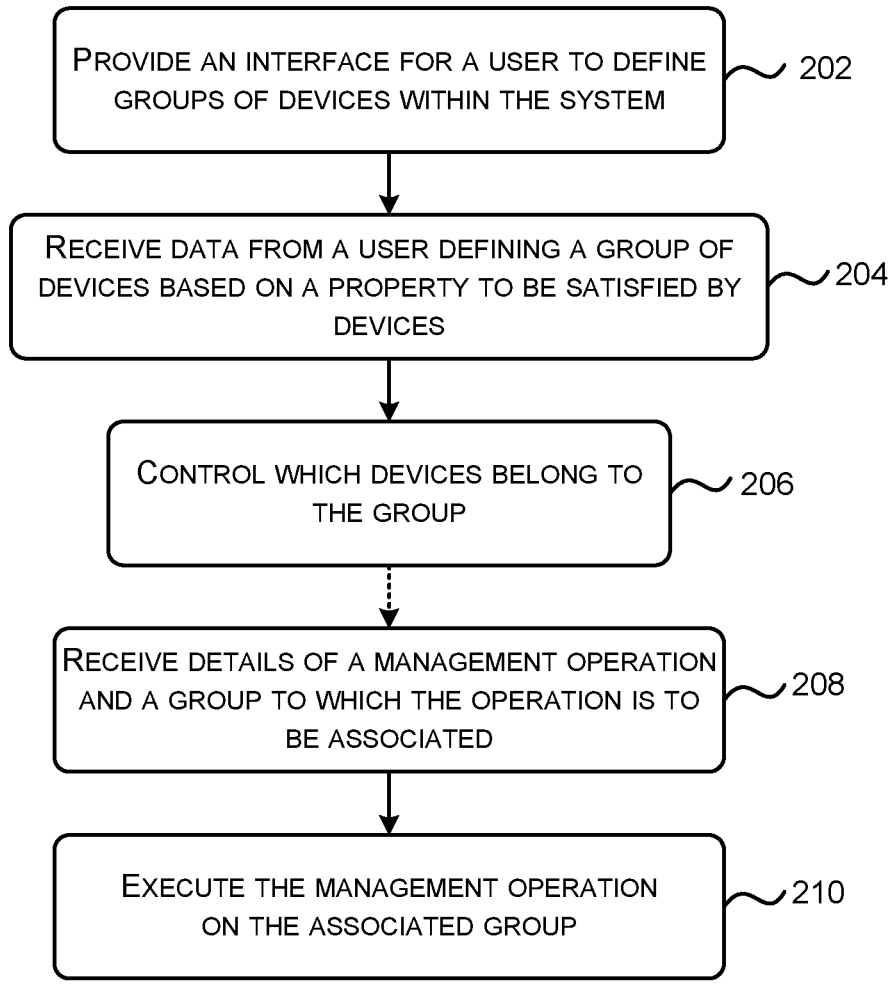
FIG. 2 is a flow diagram of an example method of operation of a management service in a distributed analytics system.

FIG. 2 shows creation of a group. Groups may also be deleted and as a group corresponds to the output of a query (the named stream of events described above, where each event represents a device or device identifier), a user may delete the group by stopping/deleting the query.

The interface provided by the management service may also enable a user to deploy queries to obtain information about end devices and these queries may be referred to as 'node queries'. These queries provide information that the user can use in defining groups and/or provide information that can be used by the management service to determine whether a device belongs to a group (e.g. current CPU usage may be sent every minute).

In order that the management service has information on all the end devices, the end devices may register with the management service when they join the system and may deregister to leave the system. In an example implementation, an end device may provide a unique identifier on registering with the management service and in some examples, metadata may be synchronized between the device and the management service (e.g. so that the management service can use this metadata to determine whether an end device meets group criterion). In other example implementations, registration may not be used and the data on end devices may be obtained in another way.

In various examples, the management service may enable a user to create hierarchies of groups. For example, there may be a group 'cars', with a sub-group 'car-brand' and further sub-groups 'car-brand-color'. This may, for example, be implemented by taking the named stream generated by a first grouping query (e.g. namedStreamDefiningGroupCar) and using it as an input to a second grouping query.

Figure 3:
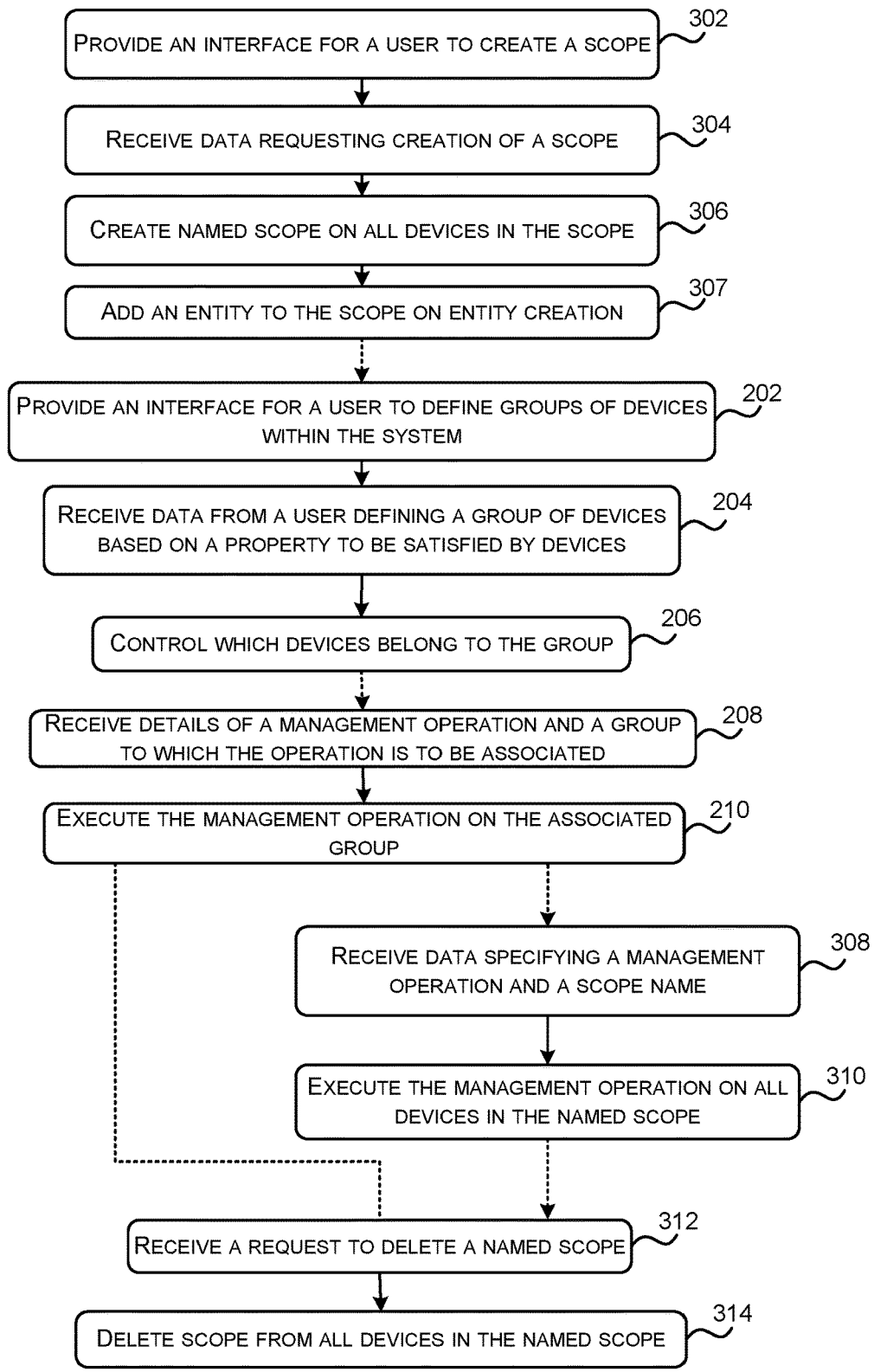
FIG. 3 is a flow diagram of another example method of operation of a management service in a distributed analytics system.

FIG. 3 is a flow diagram of another example method of operation of the management service and is a variation of that shown in FIG. 2 and described above. In this example, one or more scopes may be defined where a scope provides a categorization mechanism for entities in the system (e.g groups, queries, event types, named streams and query templates etc). A scope defines a logical boundary (or border) that encapsulates both server side (e.g. cloud) and end device elements and contains a set of entities. Through the use of scopes (where a scope may encompass the entire system), a user can manage the scope as a whole rather than entities individually. In an example, a scope may comprise more than one group and this enables a user to perform management operations on multiple groups at the same time. In another example, a scope may encompass all devices within the system such that a user can manage the entire system as a single entity. A scope also provides a namespace for deployed queries or other entities and this assists in avoiding name conflicts between entities with the same name, but different scope name.

As shown in FIG. 3, the management service provides an interface for a user to create a scope (block 302) and creates a scope (in block 306) in response to receiving a request from a user (in block 304). The user may specify the scope name (in block 304) or the management service may define the scope name (or other identifier). A user may use the management service to create more than one scope, but each scope existing concurrently is uniquely identifiable (e.g. through the use of a unique name or other identifier). Names/identifiers may be reused, but only after the scope of the same name/identifier has been deleted. A user may then add entities to the scope (in block 307), for example, when an entity is created it is added to a scope (i.e. it is created in a scope).

In an example, scopes may be used for application specific logical separation of entities, such as "Normal monitoring" queries or "Alert monitoring" queries, etc. So that when a set of queries belonging to a specific scope is not needed for example, all of them can be deleted using one operation.

Scope deletion may be performed by the management service (in block 314) in response to receiving a deletion request for a particular named scope or for all existing scopes from the user (in block 312). Scope deletion (in block 314) involves the deleting the scope from all devices where it was created and so the deletion may be a long running operation if some of the devices are disconnected at the time the deletion request is received. In various examples, deletion of a scope may not be allowed until the user has stopped or deleted all entities in the scope.

In this example, groups which are created (in block 206) are created within an existing scope (i.e. only devices from a particular existing scope and which satisfy the group criteria will join the group) and where a user has created multiple groups, the group criteria may specify the scope in which the grouping query (and hence the group) is to be created.

In addition to enabling user's to execute management operations on all devices in a group (in block 210), a user may also execute management operations on all devices in the scope (block 310) and this may be initiated by the management service receiving (in block 308) data from the user specifying the management operation and the scope name (or other identifier). For example, a user may deploy a query on all devices within a scope or where a user has deployed queryA in more than one group within a scope, a user may, in a single management operation, stop or delete queryA from all groups (within the scope) where it is deployed.

The management service may also provide other functionality to the user via the interface and one such example is to enable a user to establish the number of queries running in a scope. This may be useful to a user in deciding whether they can delete a scope or where a user wants to understand which query is running on which device.

Figure 4:
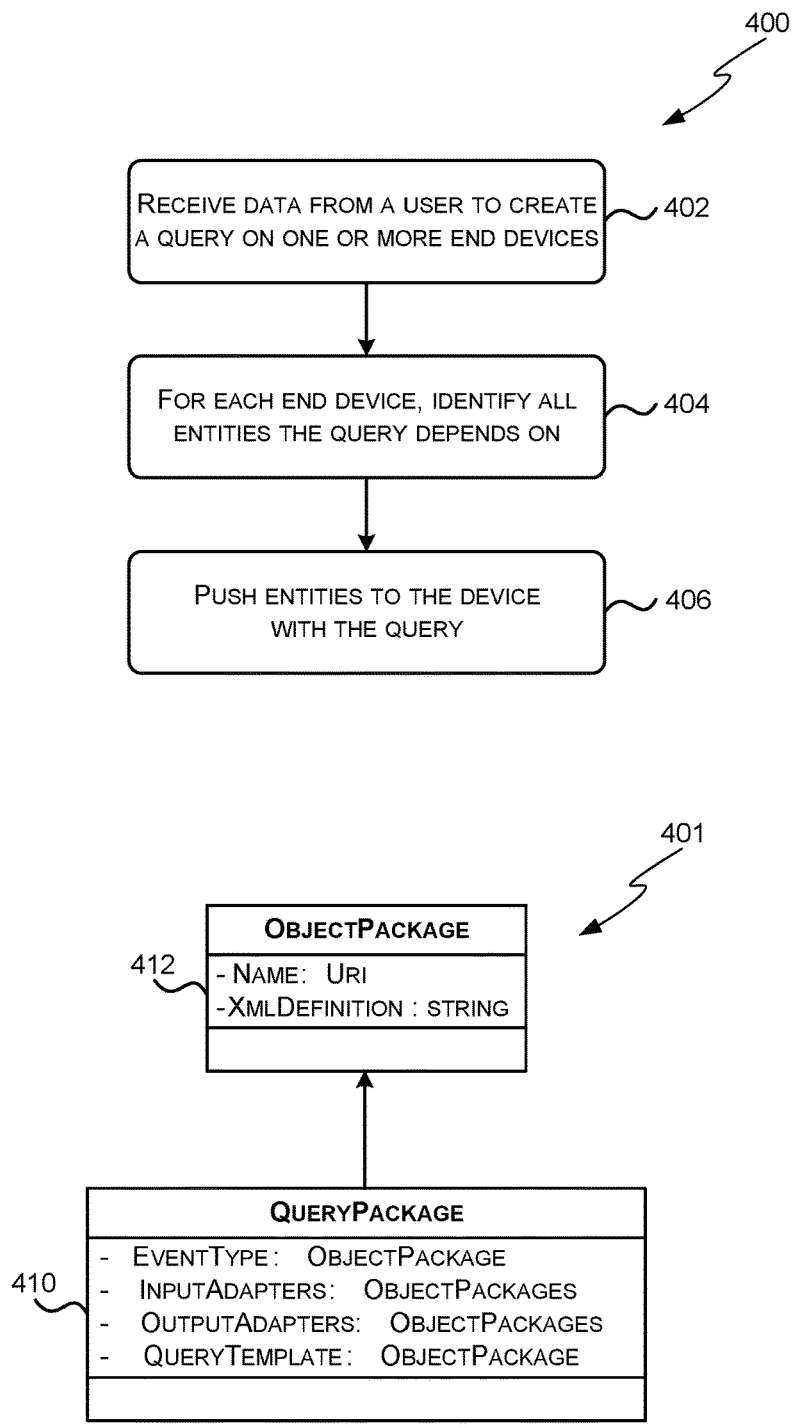
FIG. 4 comprises a flow diagram of another example method of operation of a management service in a distributed analytics system and a schematic diagram of a query package.

As described above, a user may create queries either on end devices 104 or on server side entities (e.g. servers 102). Before a query can be created, the corresponding entities on which it depends (e.g. application, event type, input/output adapters and query template) have to exist in the server side part of the system (e.g. in the cloud). Initially, all meta-objects except for queries, such as event types, input/output adapters and query templates, are created only server side (e.g. in the cloud) and not on devices. As shown in the flow diagram 400 of FIG. 4, when a query is to be created on a particular device, in response to receiving data from a user relating to creation of the query on one or more devices (in block 402), all entities it depends on are identified automatically (e.g. using tree traversal) by the management infrastructure (in block 404) and pushed to the devices together with the query (block 406). FIG. 4 also shows a schematic diagram 401 of an example query package 410 which comprises one or more object packages 412, where each object package relates to an entity such as event types, input/output adapters and query templates.

As described above, the devices where the query has to be created are specified by a temporal named stream of device events (where each event represents a device) with a pre-defined schema (which has to contain a device identifier, where in various examples this may be the unique identifier provided by a device on registration). This temporal named stream of device events (e.g. namedStreamDefiningGroup in the pseudo code example given above) identifies all the devices within the group in which the query is to be executed.

The request for an end device to create a new query will be standing, i.e. it will be persisted in the system and where a device is not currently connected, it will be executed on the device as soon as the device re-connects. When a new end device connects to the system, it may be automatically added to a default group (e.g. a 'connected devices' group) and all queries from this group will automatically be deployed on the device. The output of these queries may provide input for other group criteria and result in the end device joining other groups (and having further queries deployed on it). The operation to create queries on each device in the group may be performed asynchronously, so that the user does not have to wait when some of the devices are disconnected. However, where this asynchronous operation is implemented, there is no guarantee that any query was really created on a device when the control flow returns to the user. The output of a query is either a named stream or a built-in output adapter (e.g. as provided by OEM). An input is a named stream or an output of another query.

Figure 5:
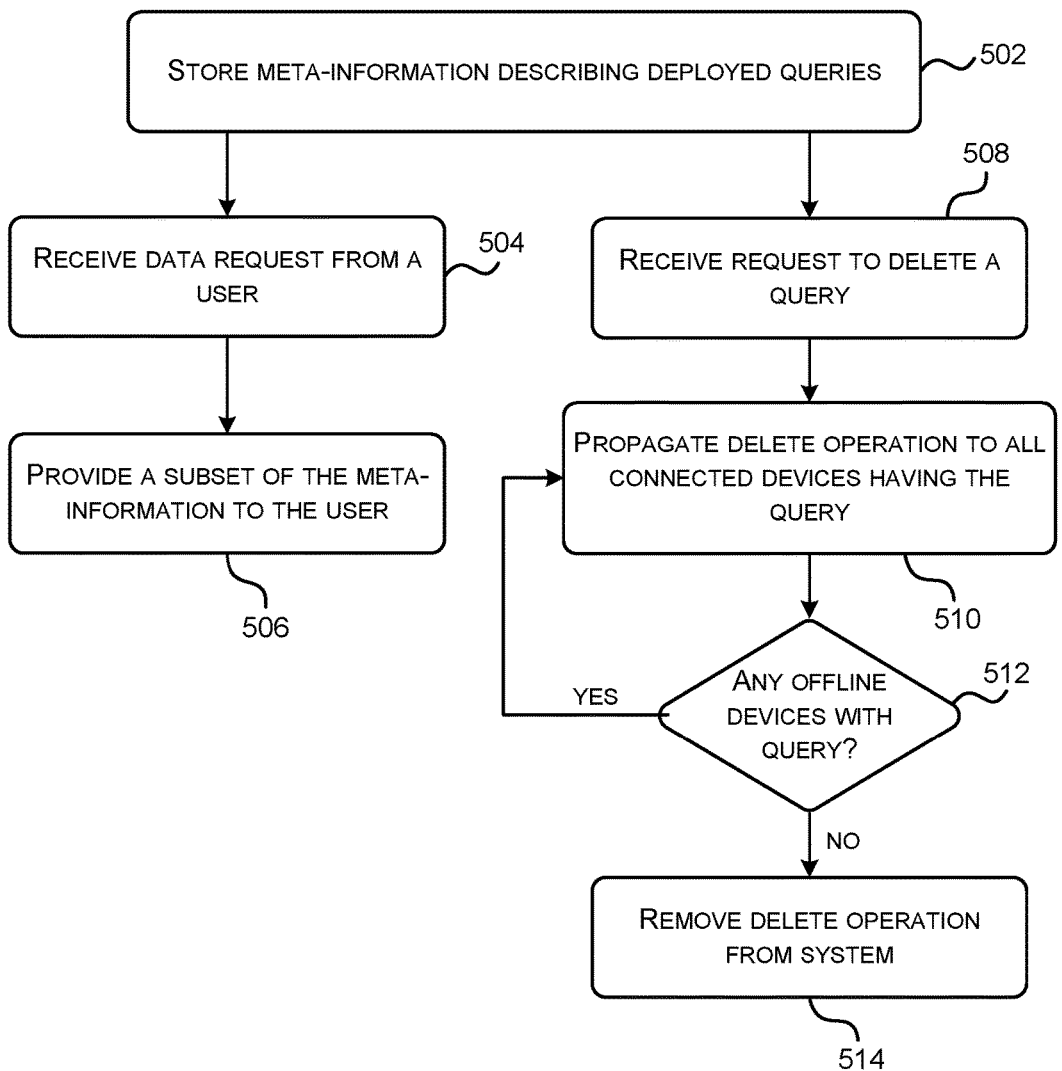
FIG. 5 is a flow diagram of a further example method of operation of a management service in a distributed analytics system.

The management service (which may also be referred to as 'management infrastructure') also allows query deletion, as shown in the example flow diagram of FIG. 5. Query deletion is a standing asynchronous operation that deletes a particular query from all the devices where the query has been previously deployed on. The delete request (which is initiated by a request received from a user in block 508) is propagated to all connected devices in the system which have the query (block 510) and stays in the system as long as there is a device that has the being deleted query. For example, there may be an offline device which still has the query that is being deleted ('Yes' in block 512) and so the delete request remains active until it has been propagated to all devices having the query and then the query itself can be deleted (block 514). In order to enable this process, the management service may store meta-information describing all devices with deployed queries (in block 502). In various examples, this information may be made available to the user (block 506) via the interface and in response to a request from the user for some data (block 504).

The user can start, stop and delete deployed queries and the three operations are available both for queries running in the cloud and on end devices, but the semantics of the particular queries used may be slightly different (e.g. for on-device queries a single operation is propagated to a set of devices having the particular query). The management service may also allow users to specify where a query is created (e.g. on end devices or in the cloud) and/or combine existing queries running in the system (e.g. the output of one query may be used as an input to another query) irrespective of whether the queries are running on end devices or server side (e.g. in the cloud).

The management operations are sent by the management service to end devices in response to data (which may be in the form of queries) received from the user via the interface. A sequence of management operations (as initiated by the user) is stored in the operation FIFO which forms part of the management infrastructure and the management operations are executed asynchronously and sequentially one by one. In various examples, the management service does not assume any dependency between the operations, and in such examples it is the responsibility of the user to make sure that the operation order is valid.

The management service described herein may additionally enable users to enumerate named streams (NS) and create/delete/bind named streams. By sending a request for data to the management service via the exposed interface (in a similar manner to the request in block 504 of FIG. 5), a user is able to obtain information on the available streams and this information may be used by the user to formulate queries correctly (i.e. when creating queries, as described above).

Figure 6:
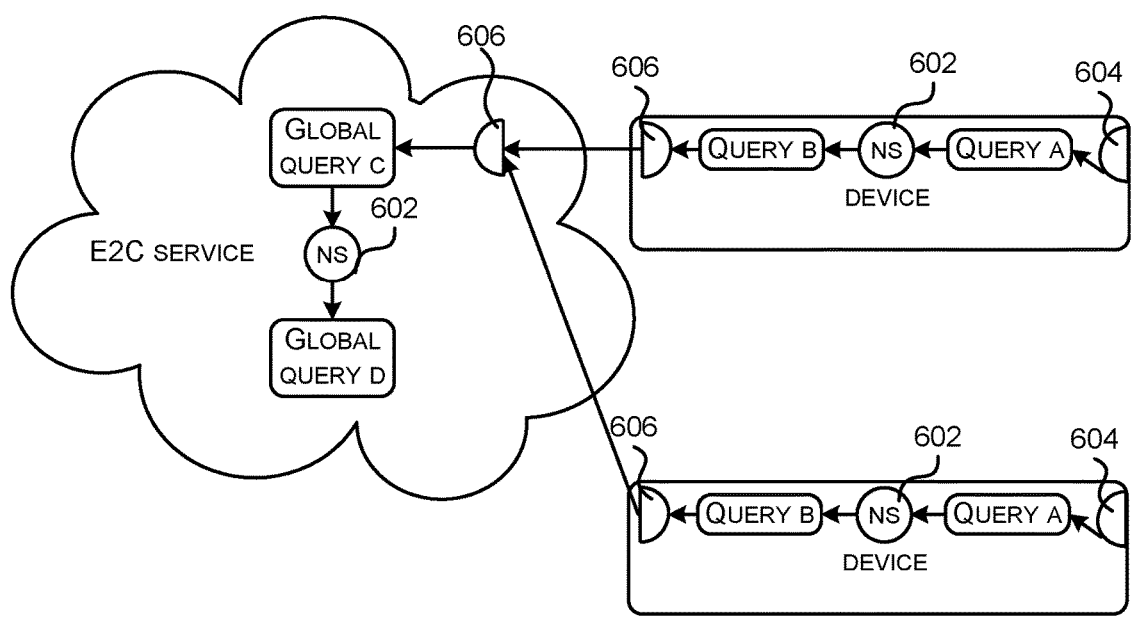
FIG. 6 is a schematic diagram showing named stream in a distributed analytics system.

In an example implementation, the management service may internally distinguish between local named streams and bridging named streams and such streams are shown in the schematic diagram in FIG. 6. Local named streams 602 have consumers and producers of the data in the same location (which may be an end device or a server side device). Bridging named streams 606 have consumers and producers in different locations (e.g. they are separated by network). In various examples, this distinction of the particular type of a named stream is only made internally to the management service and is not exposed to the user. As described above, a user may be able to obtain information (as provided by the management service) on the locations of named streams in order to be able to create a query. If a user binds queries running in the cloud and on the end device (e.g. QueryB and QueryC in FIG. 6), bridging named streams will be used automatically.

Named streams may be created or deleted on end devices or on a server side (e.g. cloud) device and different mechanisms may be used in each situation. In various examples, a user may be able to create/delete a named stream on a server side device (e.g. through the interface exposed to the user by the management service), but in some examples direct access may be required to an end device to create/delete a named stream on that particular device.

Figure 7:
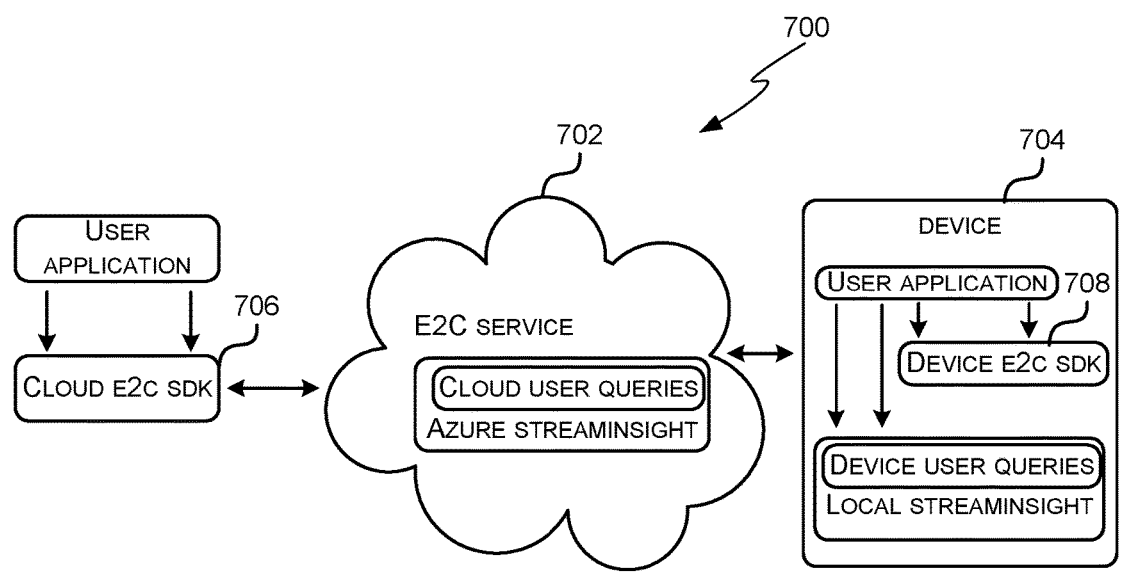
FIG. 7 is a schematic diagram of another example distributed analytics system which comprises a management service.

As described above, an end device can operate without connection to the rest of the system (e.g. to the cloud) and some end devices may have intermittent connectivity. In various examples, local metadata (e.g. all local metadata) is persisted in a local store, so that a restart of the device does not impact the end user. This local metadata comprises details of the queries running on the end device (including the state of the query). In various examples, a local interface (e.g. API) may be provided on end devices (e.g. as shown in FIG. 7 and described below) such that the state of queries potentially can be changed locally during offline operation (e.g. by a developer). While the end device is offline, the state of the same queries may also be changed in the system (e.g. in the cloud), e.g. as a result of a subsequent management operation initiated by a user or time expiry of a query, and so the state of queries may be reconciled when an end device reconnects to the system (i.e. reconnects to the management service).

Different synchronization policies (which may also be referred to as 'reconciliation policies') may be used and in one example policy, on reconnection of the device to the management service, the state of the queries will be taken from the system master replica (which may be stored and maintained by the management service). In various examples, the synchronization policy may be specified only once when the end device connects to the server.

The use of a synchronization policy enables an offline model to be supported, such that a user can perform management operations locally (e.g. where they have a direct connection to a particular end device), irrespective of whether an end device is connected to the system or is offline. State discrepancies between local and global (end device and system) are resolved on re-connection and in the example policy described above, server (or system) state prevails and in another example policy device state may alternatively prevail. In a further example, the user may be able to control which state prevails (either on end device or system state) and in such examples a user may specify a synchronization policy once (e.g. on system step up) or during connection of an end device to the system (and the policy may, in some examples, be different for different end devices in the system). In yet a further example, the synchronization policy may be based on time stamps such as the most recently stored or updated state information prevails. As described above, any suitable synchronization policy may be used.

The management service may be provided with some persistent storage for storing active management operations, (i.e. management operations which have been accepted from a user but not fully executed) and this improves the system's tolerance to failures. In such an example if a request to perform a management operation is accepted from the user and is followed by a system crash, after recovery the request is not lost and can continue its execution. Additional data may also be persistently stored, such as expected management state. This information about existing entities, running queries, etc which is available from the persistent store may also provide the ability to understand which part of the server/cloud failed. A persistent storage may also be provided on the device side (e.g. on end devices), so that the deployed queries and their state is not lost at reboot/shutdown.

In the examples described above, the management service provides an interface (e.g. an API) which enables a user to define groups (in block 202), perform management operations on a group (in block 208), create a scope (in block 302), add entities to a scope (in block 307), etc. In another example implementation, shown in the schematic diagram of FIG. 7, the management service (i.e. the management functionality provided by the service) may be exposed to the users through two different software components or software development kits (SDKs), although in other example implementations there may be only a single software component (e.g. the Cloud SDK). The operation of this system 700 is the same as the methods described above with reference to FIGS. 1-6. The system 700 shown in FIG. 7 is based on a cloud-based data analytics system 702, however the software component(s) may alternatively be used for non-cloud implementations of the system. The cloud-based data analytics system 702 may comprise many analytic engines (such as Microsoft® StreamInsight™) running in the cloud and many end devices 704 (although only one is shown in FIG. 7 for reasons of clarity) and these end devices 704 may be embedded devices.

The two software components which expose the management service to the user are referred to as the Cloud Analytics Management (CAM) SDK 706 (which may also be referred to as the Cloud SDK or Cloud E2C SDK) and the Device Analytics Management (DAM) SDK 708 (which may also be referred to as the Device SDK or Device E2C SDK), although as described above, in other implementations, there may only be CAM SDK 706. The CAM SDK 706 is used by the user to manage the analytics from the cloud without direct access to the end devices (i.e. to the end devices). It is this software component that is used by the user to define groups and submit management operations to be applied to those groups. The CAM SDK 706 may also be used to define scopes, as described above. The DAM SDK 708 is exposed for those (such as developers) with direct access to the particular end device 704 and may be used to implement an initial set of queries or named streams on the device without the device being necessarily connected to the cloud. This DAM SDK 708 may also be used to manage the connection of the device to the cloud and/or locally change the state of queries when the end device 704 is offline. The DAM SDK 708 may also be used to implement local queries on local data.

Figure 8:
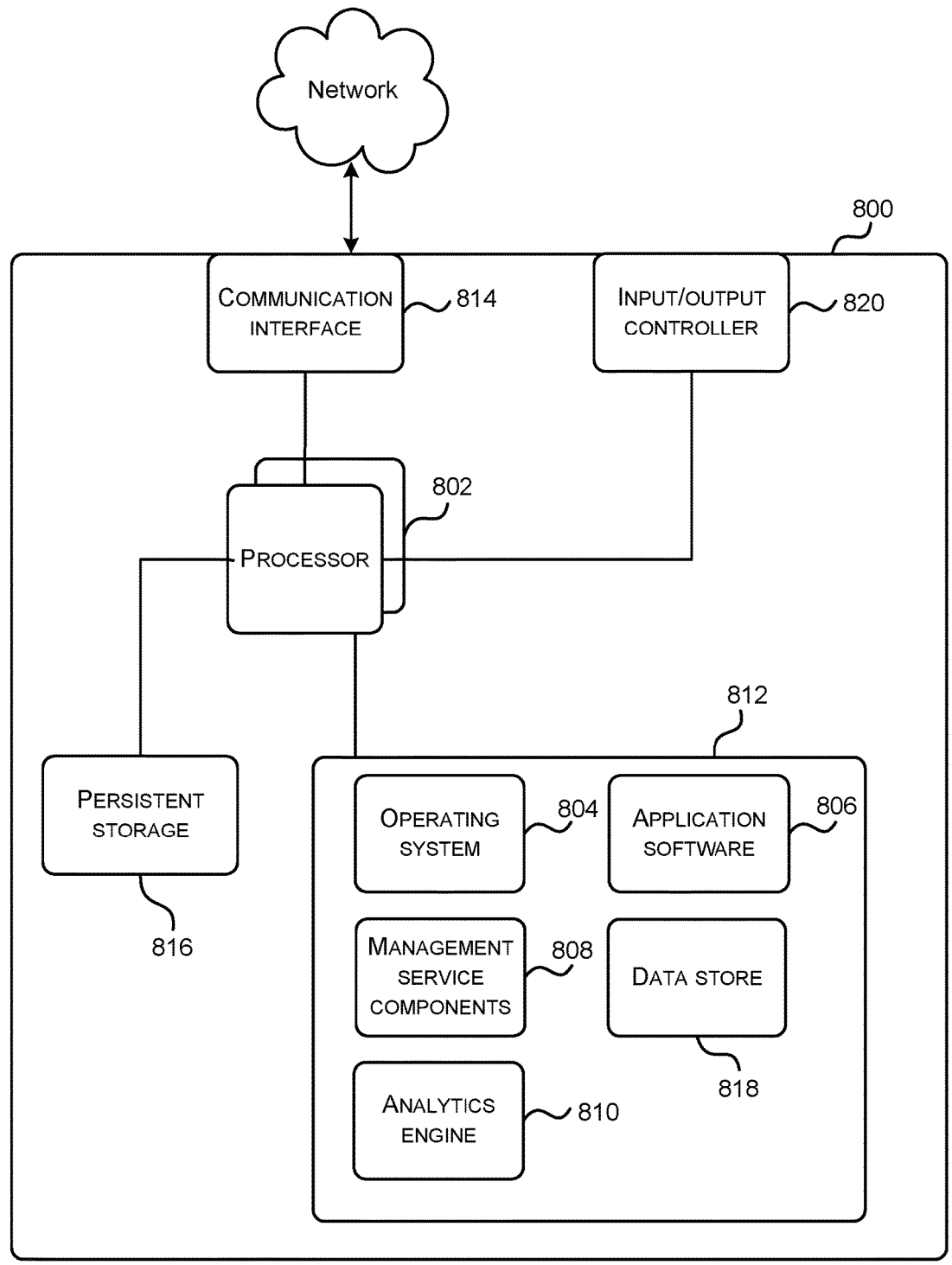
FIG. 8 illustrates an exemplary computing-based device in which embodiments of the methods described herein may be implemented.

FIG. 8 illustrates various components of an exemplary computing-based device 800 which may be implemented as any form of a computing and/or electronic device, and in which embodiments of the methods described herein may be implemented. For example, the computing-based device 800 may be a server (e.g. running an analytics engine), a user device (e.g. running the CAM SDK), or an end device.

Computing-based device 800 comprises one or more processors 802 which may be microprocessors, controllers or any other suitable type of processors for processing computer executable instructions to control the operation of the device in order to implement any of the methods described above and in particular aspects of the management functionality described above. In some examples, for example where a system on a chip architecture is used, the processors 802 may include one or more fixed function blocks (also referred to as accelerators) which implement a part of the method of managing the system or part of the data analytics engine in hardware (rather than software or firmware). Platform software comprising an operating system 804 or any other suitable platform software may be provided at the computing-based device to enable application software 806 to be executed on the device. The application software may comprise one or more of: a management service component 808 (e.g. one of the SDKs described above or the management service functionality running on a server) and an analytics engine 810 (e.g. where the computing-based device 800 is an end device which implements some analytics locally or where the computing-based device 800 is a server).

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 800 it will be appreciated that the storage may be distributed or located remotely and accessed via a network or other communication link (e.g. using communication interface 814).

As described above, in some implementations, the end devices and/or the server running the management service server side may be provided with persistent storage 816 for storing information such as active management operations or deployed queries. This persistent storage 816 may be part of memory 812 or may be a separate persistent storage element. Any non-volatile storage technology (whether removable or non-removable) may be used to provide this persistent storage 816.

The memory 812 may also provide a data store 818. The data stored by the data store 818 will be different depending on the particular role in the distributed analytics system that the computing-based device 800 has. For example, where the computing-based device 800 is a server providing the management service (and in some examples also performing analytics operations), the data store 818 may be used to store information on named streams (e.g. including their type and location) and end devices (e.g. dynamic properties of end devices), details of which end devices are part of each group and details of deployed queries (e.g. meta-information describing all devices with deployed queries).

The computing-based device 800 may also comprises an input/output controller 820 arranged to output display information to a display device which may be separate from or integral to the computing-based device 800. The display information may provide a graphical user interface. The input/output controller 800 may also be arranged to receive and process input from one or more devices, such as a user input device (e.g. a mouse, keyboard, camera, microphone or other sensor). In some examples the user input device may detect voice input, user gestures or other user actions and may provide a natural user interface. This user input may, for example, be used to define groups, queries and management operations (e.g. where the computing-based device 800 is a user device). In an embodiment the display device may also act as the user input device if it is a touch sensitive display device. The input/output controller 820 may also output data to devices other than the display device, e.g. a locally connected printing device.

The management service and methods described above enable a user to efficiently perform management operations on groups of devices, where these groups are defined based on dynamic properties of the devices. Using some of the methods described above, the management service may also operate where there is a lack of control (from the user perspective) regarding the state of connectivity of individual end devices (e.g. these devices may become disconnected at any time). The groups may be a subset of the devices within the system or in an extreme, the management service and methods described above may enable a user to manage the whole system as single entity.

The description above refers to management operations which relate to queries (e.g. creating/starting/stopping/deleting queries) by way of example only and the management operations which are executed on groups/scopes may relate to any entities of end devices.

Although the present examples are described and illustrated herein as being implemented in a cloud-based system, the system described is provided as an example and not a limitation. As those skilled in the art will appreciate, the present examples are suitable for application in a variety of different types of distributed analytics systems (e.g. on-premises systems).

Any use of terminology in the above description which is specific to Microsoft® StreamInsight™ is by way of example only and the methods described above may be applied to other CE) systems. For example, the names of entities used above may be specific to Microsoft® StreamInsight™ and in other CEP systems different names may be used, e.g. a query may alternatively be referred to as a 'rule'.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of managing end devices within a distributed system comprising:
  receiving, at a management service running on a server, data defining a temporal streaming query for grouping one or more end devices into a named stream, the temporal streaming query specifying at least one device property and at least one timeframe for possessing the at least one device property;
  adding an end device to the named stream when the end device satisfies the at least one device property during the at least one timeframe; and
  executing a management operation on the grouping of the one or more end devices in the named stream.

2. A method according to claim 1, wherein the group criteria are based on a dynamic device property.

3. A method according to claim 1, wherein the group criteria is based on a static device property.

4. A method according to claim 1, wherein the group criteria is expressed as a grouping query and wherein the method further comprises:
  propagating the group query to end devices within the system for execution locally on those end devices;

and wherein adding an end device to the group of end devices when the end device satisfies the group criteria comprises:
    adding an end device to the group of end devices on receipt of a message from an end device indicating that it satisfies the group criteria.

5. A method according to claim 1, wherein the group criteria are expressed as a grouping query and wherein the grouping query comprises a temporal streaming query.

6. A method according to claim 1, further comprising:
    generating, at the management service, a named stream of device identifiers for end devices added to the group of end devices.

7. A method according to claim 1, further comprising:
    creating a scope in response to user input; and
    adding an entity to a scope on creation of the entity, wherein each group of end devices is created within a scope.

8. A method according to claim 7, wherein the scope comprises every end device within the system and wherein the method further comprises:
    executing management operations on the scope in response to a user request.

9. A method according to claim 1, wherein the management operation is one of: creating, starting, stopping, or deleting a query.

10. A method according to claim 1, wherein said execution of the management operation comprises:
    propagating the management operation to each online end device in the grouping of the one or more end devices; and
    persisting the management operation at the management service until the management operation has been propagated to all of the end devices in the grouping.

11. A method according to claim 10, further comprising:
    storing details of any active management operations in persistent storage.

12. One or more tangible device-readable media with device-executable instructions that, when executed by a computing system, direct the computing system to perform steps comprising:
    in a distributed data analytics system, providing an interface to a user for defining a temporal streaming query for grouping one or more end devices into a named stream, the temporal streaming query specifying at least one timeframe for possessing at least one device property;
    in response to receiving data from the user specifying the temporal streaming query, controlling membership of the group through selectively adding one or more end devices to the named stream when the one or more end devices satisfy the at least one device property during the at least one timeframe; and
    receiving data from the user specifying a management operation to apply to the one or more end devices in the named stream.

13. One or more tangible device-readable media according to claim 12, further comprising device-executable instructions that, when executed by a computing system, direct the computing system to perform steps comprising:
    providing an interface to a user for definition of a scope, and wherein each group of end devices is defined with a scope and each scope has a unique identifier; and
    in response to receiving the data from the user specifying the management operation and an identifier for the scope, executing the management operation on all groups of end devices within the scope.

14. One or more tangible device-readable media according to claim 12, wherein the management operation comprises creation of a query and wherein executing the management operation on each end device in the group comprises:
    identifying any server side entities on which the query depends; and
    pushing details of each identified server side entity and the query to each end device in the group.

15. One or more tangible device-readable media according to claim 12, wherein controlling membership of the group comprises:
    in response to an end device satisfying the at least one device property during the timeframe, adding an identifier for the end device to the named stream of device the streaming query.

16. One or more tangible device-readable media according to claim 12, further comprising device-executable instructions that, when executed by a computing system, direct the computing system to perform steps comprising:
    maintaining state information for each active query in each group of end devices in the distributed data analytics system; and
    on reconnection of an end device to the system, reconciling the state information with any state information for active queries stored locally on the end device according to a synchronization policy.

17. One or more tangible device-readable media according to claim 12, wherein executing the management operation on each end device in the group comprises:
    propagating the management operation to each end device in the grouping of the streaming query;
    on reconnection of another end device in the grouping, propagating the management operation to the reconnected end device.

18. One or more tangible device-readable media according to claim 17, further comprising device-executable instructions that, when executed by a computing system, direct the computing system to perform steps comprising:
    storing details of a plurality of active management operations in persistent storage; and
    following recovery from system failure, reinitiating the plurality of active management operations stored in the persistent storage.

19. A system comprising:
    a plurality of analytics engines arranged to receive data from a large number of end devices; and
    a management service running on a server, the management service being arranged to:
        receive data defining a temporal streaming query for grouping one or more end devices into a named stream, the temporal streaming query specifying at least one device property and at least one timeframe for possessing the at least one device property;
        add an end device to the named stream when the end device satisfies the at least one device property during the at least one timeframe; and
        perform a management operation on all the end devices in the named stream.

20. A system according to claim 19, wherein the management service is further arranged to:
    propagate the management operation to any end devices in the name stream connected to the management service; and propagate the management operation to any other end devices in the named stream when said any other end devices reconnect to the management service.

* * * * *